United States Patent [19]
Needham et al.

[11] 3,818,177
[45] June 18, 1974

[54] ARC WELDING

[75] Inventors: James C. Needham, Essex; Albert W. Carter, Cambridge, both of England

[73] Assignee: The Welding Institute, Cambridge, England

[22] Filed: Sept. 5, 1972

[21] Appl. No.: 286,055

[52] U.S. Cl............................................. 219/131 R
[51] Int. Cl................................................ B23k 9/10
[58] Field of Search ............ 219/131, 136, 135, 137; 323/22 SC, 23, 24, 25; 315/166, 174, 176

[56] References Cited
UNITED STATES PATENTS
| | | | |
|---|---|---|---|
| 2,472,323 | 6/1949 | Welch, Jr. | 219/131 R |
| 3,249,735 | 5/1966 | Needham | 214/131 R |
| 3,284,666 | 11/1966 | Hajicek | 219/131 R |
| 3,356,928 | 12/1967 | Parrish | 219/131 R |
| 3,497,769 | 2/1970 | Stearns | 214/131 R |

Primary Examiner—J. V. Truhe
Attorney, Agent, or Firm—Kemon, Palmer & Estabrook

[57] ABSTRACT

A pulsed A.C. arc welding system includes a background A.C. power supply for maintaining a background arc between an electrode and a workpiece. A main A.C. power supply is intermittently connected across the arc to provide heavy current welding pulses and the main supply is temporarily isolated from the arc at the start of each electrode positive half-cycle of arc current such that the voltage from the background supply reaches a value sufficient to re-ignite the arc after each negative to positive current reversal.

9 Claims, 5 Drawing Figures

ARC WELDING

Pulsed D.C. tungsten-arc inert-gas welding has already been used to advantage in the welding of a variety of materials. It is particularly useful in welding low heat sink components, and in reducing the distoriton in a weld.

Unfortunately a D.C. supply cannot be used with certain metals such as aluminum or magnesium, or with their alloys. For these metals, an A.C. supply is required so that the cathodic action of the arc can be used to disrupt the tenacious oxide coating. With A.C., however, the reversals of voltage and current introduce the problem of arc re-ignition as the arc is extinguished twice in every cycle. The arc ignites satisfactorily after a positive to negative reversal since the tungsten electrode acts as a thermionic emitter. After a negative to positive reversal, on the other hand, a cathode has to be formed on the weld plate. For this to be possible, sufficient voltage must be available at the arc gap, and, for a conventional A.C. tungsten-arc inert-gas process with a typical arc current of approximately 80A on a pure aluminum plate, a voltage of 160V (RMS) is required.

For pulsed A.C. tungsten-arc inert-gas welding the problem of re-ignition is more severe because a low background current of around 3-12A is required between pulses, and we have found that to obtain consistent arc re-ignition at these low currents requires a RMS voltage of at least 250V giving a peak voltage of approximately 360V. The provision of such a high voltage source for both low background and high current pulses is wasteful and needs an excessively large kVA supply. A two source supply has therefore been proposed, one high voltage/low current (therefore low kVA) for the background, and the other lower voltage/high current for the welding pulses. The difficulty of connecting a background supply providing such a high voltage in parallel with the power circuit which supplies the heavy current welding pulses is that the power circuit has a lower open circuit voltage (usually between 65 and 100V), and the high re-strike voltage of the background supply is therefore dissipated in the lower impedance of the power circuit.

According to the present invention a pulsed A.C. arc welding system in which a main A.C. supply is intermittently connected across an arc maintained by a background A.C. supply to provide heavy current welding pulses further includes means operative when the main supply is connected across the arc for temporarily isolating the main supply from the arc at the start of each electrode positive half cycle of arc current whereby the voltage from the background supply reaches a value sufficient to re-ignite the arc after each negative to positive current reversal.

In one embodiment of the invention the temporary isolation of the main supply is controlled by a thyristor which is fired a predetermined interval after the arc has been re-ignited on each positive half-cycle. The predetermined interval is set to correspond to the time required for the current to reach a level sufficient to sustain an arc after the arc has been re-ignited. During this period a glow discharge is formed between the electrode and the workpiece. The thyristor then remains conducting until the arc is extinguished at the next current zero when the electrode changes polarity from positive to negative. The thyristor is preferably connected in parallel with an oppositely directed diode or with another thyristor which conducts during the negative electrode half-cycle. Thus, during the negative electrode half-cycle, when a high re-strike voltage is not required, the first thyristor is short-circuited, and the main supply therefore remains connected across the arc.

When a pair of thyristors are used as the isolating means in the output circuit of the main supply, the two thyristors can also be used as the main pulse switch to control the mark space ratio of the heavy current pulses.

A further problem which arises in A.C. tungsten-arc inert-gas welding is that there is a difference in the arc voltage during the positive and negative half-cycles which produces a corresponding difference in the current flowing during the different half-cycles. This difference in current gives rise to an undesirable D.C. component during welding and, according to a subsidiary feature of the invention where a second thyristor is used to connect the main supply for the negative current periods, the firing of the second thyristor is retarded during the negative current half-cycle such that substantially equal currents flow during each half-cycle. Alternatively the same effect can be achieved if the firing of the second thyristor inserts additional inductance into the output circuit of the main power supply or switches to a lower voltage tapping on the welding transformer for the negative half-cycle.

In order that the invention may be more readily understood two examples will now be described with reference to the accompanying drawings in which.

Figure 1:
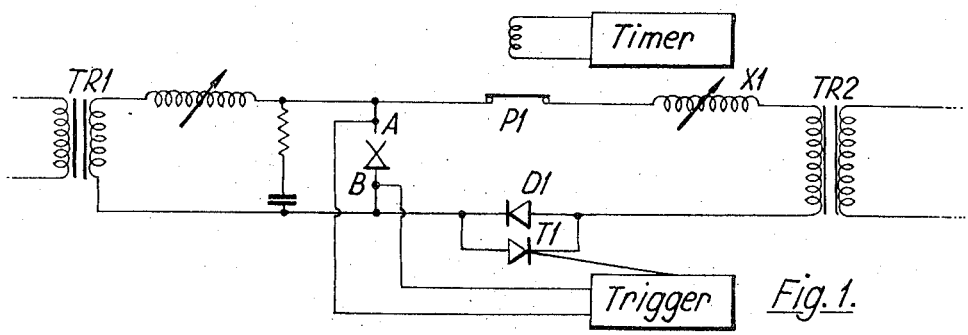
FIG. 1 is a circuit diagram of a pulsed A.C. arc welding system using a thyristor diode pair to control the welding pulses.

Referring first to FIG. 1, a background A.C. supply voltage is supplied through transformer TR1 to the welding arc terminals AB. The main welding transformer TR2 is connected in parallel with the background supply across the arc terminals, and a square-wave pulse is periodically superimposed on the background voltage by repeated closing of an electromagnetic contactor P1. The period of the superimposed pulses is controlled from a pulse timer unit. The background voltage is just sufficient to maintain the arc, and the superimposed square-wave pulses are of sufficient magnitude to melt a weld pool.

A diode D1 and a thyristor T1 conduct alternately during each heavy current pulse, the diode D1 conducting on the tungsten electrode negative half-cycles, and the thyristor being triggered in response to the arc striking voltage which is generated at current zero when the electrode is changing polarity from negative to positive.

Figure 2:
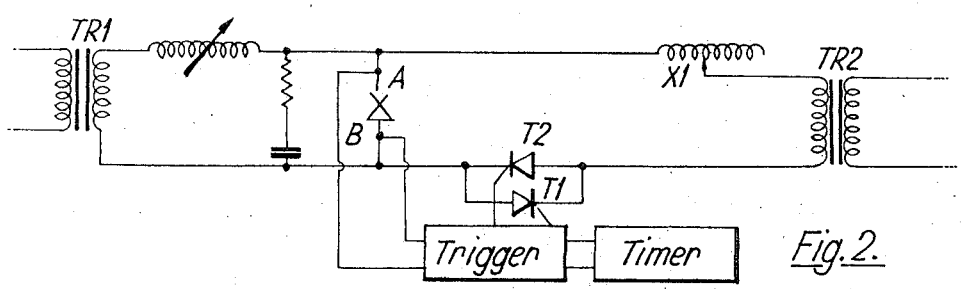
FIG. 2 is a circuit diagram of a pulsed A.C. arc welding system using a pair of thyristors to control the welding pulses.

Referring next to FIG. 2, the diode D1 of FIG. 1 is replaced by a second thyristor T2, and the contactor P1 is omitted. The thyristors T1, T2 form the main pulse switch which periodically connects the main supply across the welding arc. These welding pulse periods are controlled from a pulse timer unit. The firing of the thyristors in each half-cycle of the arc voltage is then further modified so that the firing of the first thyristor T1 is delayed a predetermined interval after the re-igniting of the arc in the positive half-cycle (to allow for the glow discharge period immediately following re-ignition), but the firing of the second thyristor T2 is delayed even further in the negative half-cycle in order to reduce the current in the negative half-cycle. In this way the currents flowing in the positive and negative half-cycles can be made approximately equal.

The phase controlled firing of the thyristors T1, T2 can also be used to control the current level for each welding pulse. Thus the current may be adjusted in coarse steps using the variable inductance X1 with the phase control providing a fine adjustment.

Figure 3:
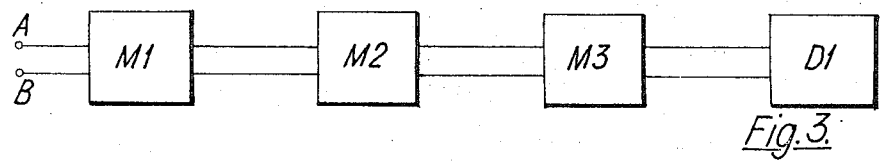
FIG. 3 is a block circuit diagram of the thyristor trigger circuits shown in FIG. 2.

In FIG. 3 the arc voltage developed across terminals A, B is fed to a monostable multivibrator M1. The high voltage spike which is developed across the electrodes when the arc extinguishes while the electrode polarity is changing from negative to positive is detected at the input terminals A, B and a potential divider divides the signal to a value of approximately 2 volts. This signal is sufficient to trigger the first monostable multivibrator which produces a pulse after a delay which is set to correspond to the time required for the background supply to sustain an arc following re-ignition. The output pulse from the multivibrator M1 triggers a second monostable multivibrator M2 giving an output pulse of fixed duration which turns on an astable multivibrator M3 which oscillates at a frequency of approximately 200 KHz. A driver stage D1 follows the oscillations and provides a drive signal to the gate of thyristor T1. The oscillations are maintained until the monostable multivibrator M2 relaxes and switches off the astable multivibrator M3. The delay introduced by the monostable multivibrator M1 can be adjusted to vary the firing time of the thyristor T1.

A similar system can be used to fire thyristor T2.

Figure 4:
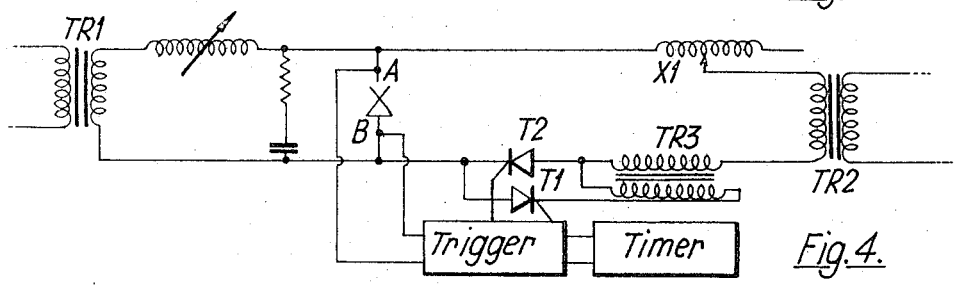
FIG. 4 is a circuit diagram identical to that of FIG. 2 but illustrating one method of balancing the current flow in each half-cycle; and, FIG. 5 is a circuit diagram identical to that of FIG. 2 but showing a further method of balancing the current flow in each half-cycle.

In FIG. 4 the firing of thyristor T1 causes current to flow through the second winding of a transformer TR3 so that a different amount of inductance is switched into the circuit by each thyristor to balance the current flow in each half-cycle.

Figure 5:
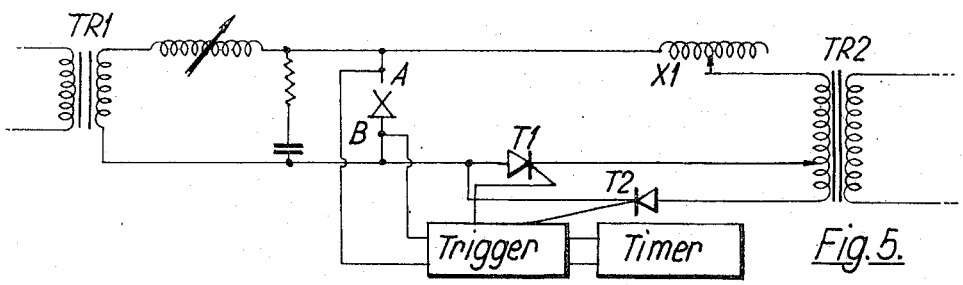

In FIG. 5 the thyristors T1, T2 switch to different voltage tappings on the output transformer TR2 to achieve the same effect of balancing the current flows in the opposite half-cycles.

We claim:

1. A pulsed A.C. arc welding system comprising: a welding electrode, a high voltage/low current background A.C. power supply connected to the welding electrode for maintaining a background A.C. arc between said electrode and a workpiece, a low voltage/high current main A.C. power supply, means for intermittently connecting the main supply across an arc maintained by said background supply to provide heavy current welding pulses, and isolating means connected between the two power supplies and operative when said main supply is connected across the arc for temporarily isolating said main supply from the arc and from the background supply at the start of each electrode positive half-cycle of arc current whereby the voltage from the background supply reaches a value sufficient to reignite the arc after each negative to positive current reversal.

2. A system according to claim 1 in which each of said power supplies includes an output transformer and said isolating means comprises a thyristor connected in a series loop with the secondary windings of the two transformers, the system further comprising a thyristor trigger circuit and means for actuating the trigger circuit a predetermined interval after the arc has been reignited on each positive half-cycle.

3. A system according to claim 2 in which the thyristor is connected in parallel with an oppositely directed diode.

4. A system according to claim 2 in which the thyristor is connected in parallel with a seocnd oppositely directed thyristor, the system further comprising means for firing the second thyristor so that it conducts for at least a portion of the negative electrode half-cycle of arc current.

5. A system according to claim 4 in which the two thyristors together form the said means for intermittently connecting the main supply across an arc maintained by said background supply.

6. A system according to claim 4 including means for controlling the firing point of each thyristor in each half-cycle such that the second thyristor conducts for a shorter period than the first thyristor in order to balance the current flows in each half-cycle.

7. A system according to claim 4 further comprising a first inductance connected between a first of the thyristors and the secondary winding of the main supply output transformer and a second inductance connected in series with the second thyristor across the first thyristor.

8. A system according to claim 7 in which the first and second inductances comprise the primary and secondary windings of a third transformer.

9. A system according to claim 4 in which a first of the thyristors is connected to a first voltage tapping on the said secondary winding of the main supply output transformer and the second thyristor is connected to a second voltage tapping on said transformer such that substantially equal currents flow in each half-cycle.

* * * * *